US006293155B1

(12) United States Patent
Babiel

(10) Patent No.: US 6,293,155 B1
(45) **Date of Patent: *Sep. 25, 2001**

(54) METHOD FOR OPERATING AN ELECTRIC PRESS

(75) Inventor: Hartmut Babiel, Rottweil-Göllsdorf (DE)

(73) Assignee: Gebr, Schmidt Fabrik für Feinmechanik, St. Georgen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/373,286

(22) Filed: Aug. 12, 1999

Related U.S. Application Data

(63) Continuation of application No. PCT/EP98/00040, filed on Jan. 7, 1998.

(30) Foreign Application Priority Data

Feb. 13, 1997 (DE) ............................................. 197 05 462

(51) Int. Cl.[7] ....................................................... G01N 3/08

(52) U.S. Cl. ............................................................... 73/818

(58) Field of Search ........................ 73/818, 825, 862.53, 73/862.541; 364/476

(56) References Cited

U.S. PATENT DOCUMENTS 4,750,131 6/1988 Martinez .
4,939,665 * 7/1990 Gold et al. ...................... 364/476.01
5,119,311 * 6/1992 Gold et al. ...................... 364/476.01
5,483,874 1/1996 Shimizu et al. .
5,564,298 10/1996 DeMeo .
5,587,633 12/1996 Aoki et al. .
5,669,257 9/1997 Inoue et al. .

FOREIGN PATENT DOCUMENTS

3715077 A1 12/1988 (DE) .
9014783 U1 4/1992 (DE) .
19548439 A1 7/1996 (DE) .
19606842 A1 8/1996 (DE) .
63180400 7/1988 (JP) .
06218591 8/1994 (JP) .

* cited by examiner

*Primary Examiner*—Max Noori
(74) *Attorney, Agent, or Firm*—Harness, Dickey & Pierce, P.L.C.

(57) ABSTRACT

A method is described for operating an electric press which comprises an electrically actuated press ram, at least one displacement sensor for sensing positions of the displacement of the press ram during its working stroke, at least one force sensor for sensing compressive force applied by the press ram during the working stroke onto workpieces to be processed, and a control system which controls the working stroke in terms of displacement and compressive force. Parameters which indicate a successful course or completion of the pressing operation are dynamically adapted as a function of the profile of the compressive force versus the displacement of the press ram.

7 Claims, 2 Drawing Sheets

METHOD FOR OPERATING AN ELECTRIC PRESS

This is a continuation of International patent application No. PCT/EP98/00040, filed Jan. 7, 1998.

BACKGROUND OF THE INVENTION

1. Field of the Invention

The present invention relates to a method for operating an electric press which comprises an electrically actuated press ram, at least one displacement sensor for sensing positions of the displacement of the press ram during its working stroke, at least one force sensor for sensing compressive force applied by the press ram during the working stroke onto workpieces to be processed, and a control system which controls the working stroke in terms of displacement and compressive force, having the steps:

a) moving the press ram into its initial position;

b) lowering the press ram onto the workpieces to be processed, and measuring the compressive force;

c) detecting the onset of pressing based on a rise in the compressive force;

d) further lowering the press ram to perform the pressing operation, and monitoring the compressive force being applied; and e) halting the press ram when the latter has reached a preset joining or end position.

2. Related Prior Art

A method of this kind is known from U.S. Pat. No. 5,483,874.

The known method is carried out on an electric press which comprises a spindle drive driven by an electric motor. The threaded spindle of the spindle drive is mounted rotatably but axially nondisplaceably, while the spindle nut is mounted nonrotatably but axially displaceably, and is joined to the press ram.

The electric press has displacement sensors and force sensors in order to sense the profile of the compressive force versus the displacement of the press ram during its working stroke and report it to a control system which, on the basis of these data, controls the working stroke.

At the beginning of a pressing operation, the press ram is moved into its initial position above the workpiece, and is then lowered onto the workpiece or workpieces to be processed.

The compressive force is measured during this lowering, and the fact that the pressing operation is beginning is detected on the basis of a rise in this compressive force, whereupon the lowering rate of the press ram is decreased.

The press ram is lowered further during the pressing operation which then follows, the applied compressive force then being monitored to determine whether it remains constant during the pressing operation. The displacement of the press ram also continues to be monitored in order to detect when it has reached a joining position (therein called the end position) in which the press ram essentially does not move any farther down. When this end position has been reached, the press ram is retracted.

If the end position is not reached, or if a constant pressure is not applied during the pressing operation, the pressing operation is terminated.

It has now been found that it is possible, in the context of this kind of method, for a compressive force that it is sometimes too high and also sometimes too low to be applied, depending on tolerances of the workpieces to be processed, so that some of the workpieces are not correctly joined and some are damaged by excessive compressive force.

In order to process the workpieces gently and reproducibly, they therefore must have very narrow tolerances; if these tolerances are exceeded upward or downward, the known method terminates the pressing operation because the end position is not reached and/or the compressive force is not constant; this can result in unnecessary wastage.

SUMMARY OF THE INVENTION

In view of the above, it is an object of the present invention to improve the method mentioned at the outset so as to make possible gentle processing even of parts with coarser tolerances, so as thereby to prevent unnecessary wastage or reduce the wastage.

In the case of the method mentioned at the outset, this object is achieved according to the present invention in that parameters which indicate a successful course and/or completion of the pressing operation are dynamically adapted as a function of the profile of the compressive force versus the displacement of the press ram.

The object underlying the invention is completely achieved in this fashion.

Specifically, the inventors of the present application have recognized that the high wastage with the known method is attributable in particular to the fact that the beginning of the pressing operation is dynamically sensed, but not the completion of the pressing operation. In the prior art, a fixed end position is defined here; whether it is reached or not reached determines the success of the pressing operation. In addition, a constant compressive force is required during the pressing operation, any deviation from that constant compressive force also being considered as wastage.

What is critical to the successful completion of a pressing operation, however, is not so much the beginning of the pressing operation but rather the profile of the pressing operation versus the displacement of the press ram, as well as the location of the joining point and the compressive force applied in the joining point.

The new method now makes available intelligent assembly even of parts with coarser tolerances, since the parameters critical to the result of the pressing operation are dynamically derived and adapted from the profile of the compressive force during the working stroke of the press ram. Based on those parameters, after completion of a pressing operation a conclusion can be drawn as to whether the pressing operation was successful and corresponds to predefined test values.

It is especially preferred in this context if the end position is adapted dynamically as a function of the position of the press ram at the onset of pressing.

The advantage here is that in the simplest case, the end position is shifted by the same magnitude by which the onset of pressing shifts. This is done, for example, by storing a sample curve in the control system, a constant distance between onset of pressing and end position always being assumed and defined.

On the other hand, it is preferred if the end position is dynamically adapted or detected as a function of a sharp rise in the compressive force in the region of the end position.

The advantage here is that in addition to or instead of the coarse adaptation of the end position as a function of the onset of pressing, the direct joining point—at which, for example when joining two workpieces, the latter were pressed into a unit—is detected. The joining or end position can differ for different workpieces as a function of workpiece tolerances, so that a determination of the end position solely from the onset of pressing is not as reliable as deriving the joining position from the sharp rise in the compressive force. This can be done, for example, by continuously monitoring the change in compressive force with displacement or with time, so that the joining point is detected in real time by analyzing that rise.

It is further preferred if the pressing operation is terminated in dynamically adapted fashion as a function of the sharp rise in compressive force.

The advantage here is that not only the joining position itself, but also the compressive force yet to be applied in the joining position, are adapted dynamically as a function of the workpiece tolerances. This is because depending on the workpiece tolerances, it is possible that a relatively low compressive force was applied in one case at the onset of the actual joining operation, while for workpieces having different tolerances, a very high compressive force was already necessary simply to press the workpieces into a unit in the joining position. What is done now, in order to compensate for these tolerances, is not to predefine a high compressive force that must be reached, which is sufficient for all expected tolerances but in some cases is much too high. Instead the pressing operation is dynamically completed, as a function of the change in slope of the compressive force profile, as soon as the workpieces have arrived in the joining position.

In the case of the method described so far, the parameter “joining or end position” is thus dynamically adapted based on the position of the press ram at the onset of pressing, the sharp rise in compressive force upon reaching the joining position, and optionally the instantaneous value of the compressive force upon reaching the joining position; the result is greatly to reduce the effect of workpiece tolerances, so that altogether the wastage declines sharply as compared with the method known from the prior art.

It is further preferred, however, if the profile of the compressive force versus the displacement of the press ram is monitored to determine if certain parameter sets are being observed, the parameter sets being dynamically adapted as a function of the position of the press ram at the onset of pressing.

The further advantage here as compared with the method described so far is that depending on how the press is used, not only the joining position but also further intermediate positions, at which the compressive force must lie within specific ranges, are monitored. What may be observed, for example, is the fact that when parts are being joined, the compressive force exhibits a certain superelevation when the press ram has travelled a certain distance since the onset of pressing and stiction transitions into sliding friction. Characteristic curve profiles of this kind can be described by parameter sets which define a “window” through which the curve for the compressive force versus displacement must pass in order for the result of the pressing operation to be satisfactory. If the curve does not pass appropriately through one of these windows, a decision can then be made relatively promptly that this pressing operation can no longer be satisfactorily completed, and it is thus terminated immediately. This early discontinuation can prevent damage to the electric press itself as well as destruction of the workpieces, which may simply have been assembled incorrectly, so that realignment of the workpieces will still allow successful joining; the result is thus once again to decrease the wastage.

It must also be mentioned that the monitoring windows need only to be shifted as a function of the onset of pressing in order to allow parts with different tolerances to be sensed. In this context it is possible on the one hand to shift the windows along the displacement axis, but a shift along the compressive force axis is also possible.

It is further preferred if the parameter sets are ascertained by processing and measuring sample workpieces.

The advantage here is that by processing and taking averages for several workpieces, it is possible to define reliable parameter sets or windows which are important for quality control of the pressing operation. For example, a permissible deviation in terms of compressive force or compressive displacement can be defined in the parameter sets; workpieces for which the window is missed are then picked out as waste.

It is preferred in this context if, at least during the processing of sample workpieces, the compressive force profile is displayed on a screen in real time.

The advantage here is that the profile of the compressive force can easily be observed even during the “teach-in” process, so that even at that early point corresponding windows can be defined which can then be checked or further modified when additional sample workpieces are processed. This determination of the parameter sets or windows with the greatest possible accuracy allows good control over the actual pressing operation on workpieces intended for further processing, so that their wastage can be greatly decreased.

Lastly, it is also preferred if, at least during the processing of sample workpieces, the applied compressive force is modified via an electronic handwheel.

The advantage here is that the necessary compressive force can be ascertained and defined in simple and very accurate fashion, since not only the working stroke (i.e. the displacement of the press ram) but also the compressive force applied, in particular, in the joining position, can be adjusted manually. This makes it possible to prevent the definition of an excessive compressive force which might allow the destruction of workpieces with appropriate tolerances despite the features according to the present invention described above.

In other words, it is possible by the use of an electronic handwheel to adjust the compressive force, and by way of the compressive force/displacement curves to be monitored in real time, to ascertain optimum parameter sets with the aid of sample workpieces; those parameter sets make it possible to achieve gentle and reliable joining or processing even with workpieces having coarser tolerances. The dynamic modification of these parameter sets as a function of the instantaneous compressive force profile while processing workpieces makes possible on the one hand a decrease in the wastage thanks to optimal adjustment of the compressive force and joining position, and on the other hand timely detection of failed pressing operations, as already described above.

Further advantages are evident from the specification and from the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is shown in the attached drawings and will be explained in more detail in the description below. In the drawings.

DETAILED DESCRIPTION OF A PREFERRED EMBODIMENT

Figure 1:
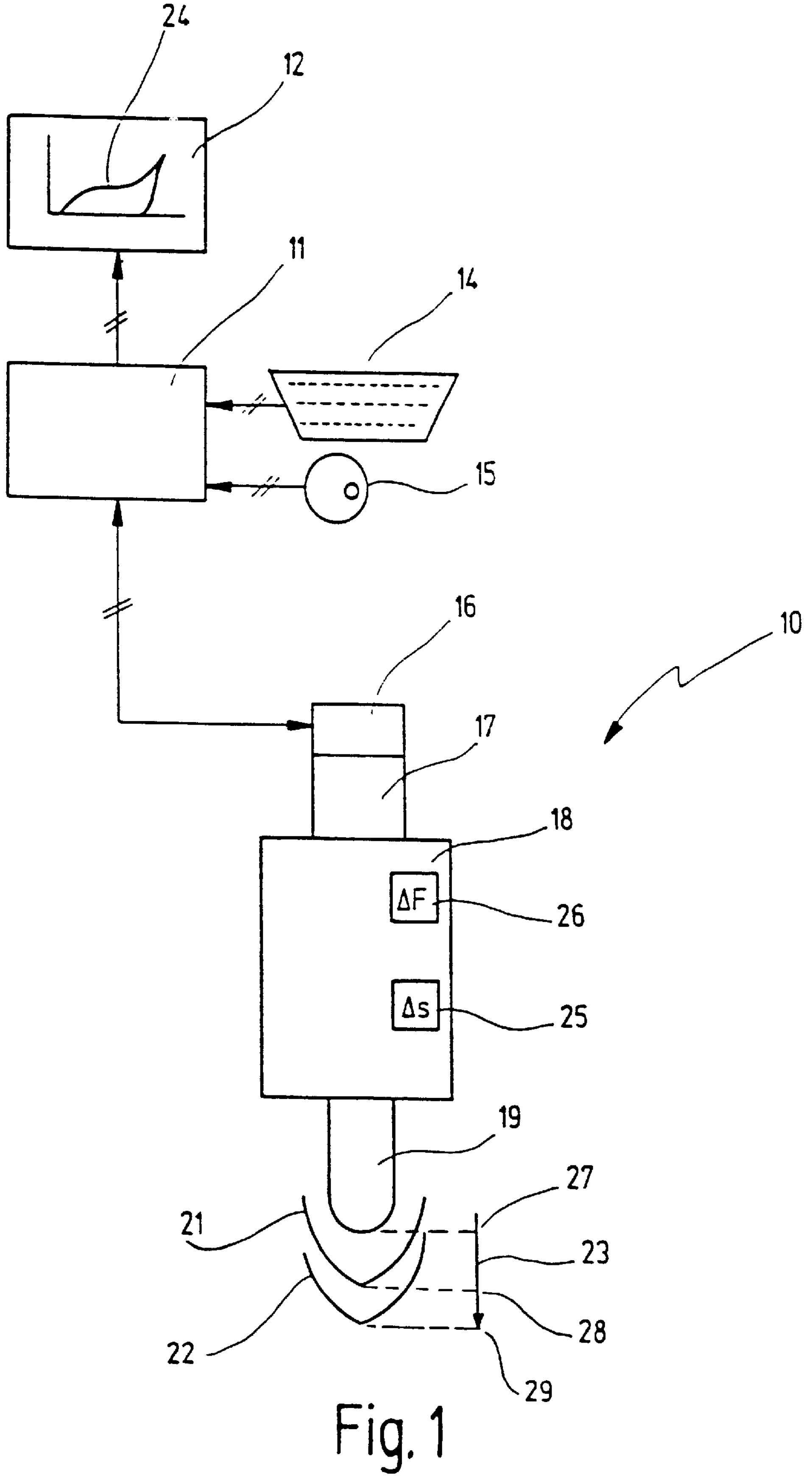
FIG. 1 shows a schematic block diagram of an electric press to be operated according to the present invention.

In FIG. 1, 10 generally designates an electric press which is operated via a control system indicated at 11. A screen 12, a keyboard 14, and an electronic handwheel 15 are connected to control system 11.

Also connected to control system 11 is an interface 16 of electric press 10 which makes possible control and monitoring of the pressing operations, as will be described later.

Electric press 10 has an electric motor 17 which is mounted on a housing 18. A schematically indicated press ram 19, which is actuated via electric motor 17, projects downward out of housing 18.

Schematically indicated below electric press 10 are two workpieces 21 and 22 which are to be joined to one another by electric press 10, for which purpose press ram 19 performs a working stroke indicated at 23.

The profile for compressive force over displacement which thereby results is displayed in real time on screen 12 as curve 24, for which purpose a displacement sensor 25 and a force sensor 26 are provided in electric press 10.

In the position shown in FIG. 1, press ram 19 is in its initial position 27. When press. ram 19 is moved farther downward in FIG. 1, at the onset of pressing 28 it comes into contact with workpieces 21 and 22 which it then, during the further course of its working stroke 23, presses into a unit, this occurring in its joining position 29. Press ram 19 is then retracted back into its initial position 27.

Figure 2:
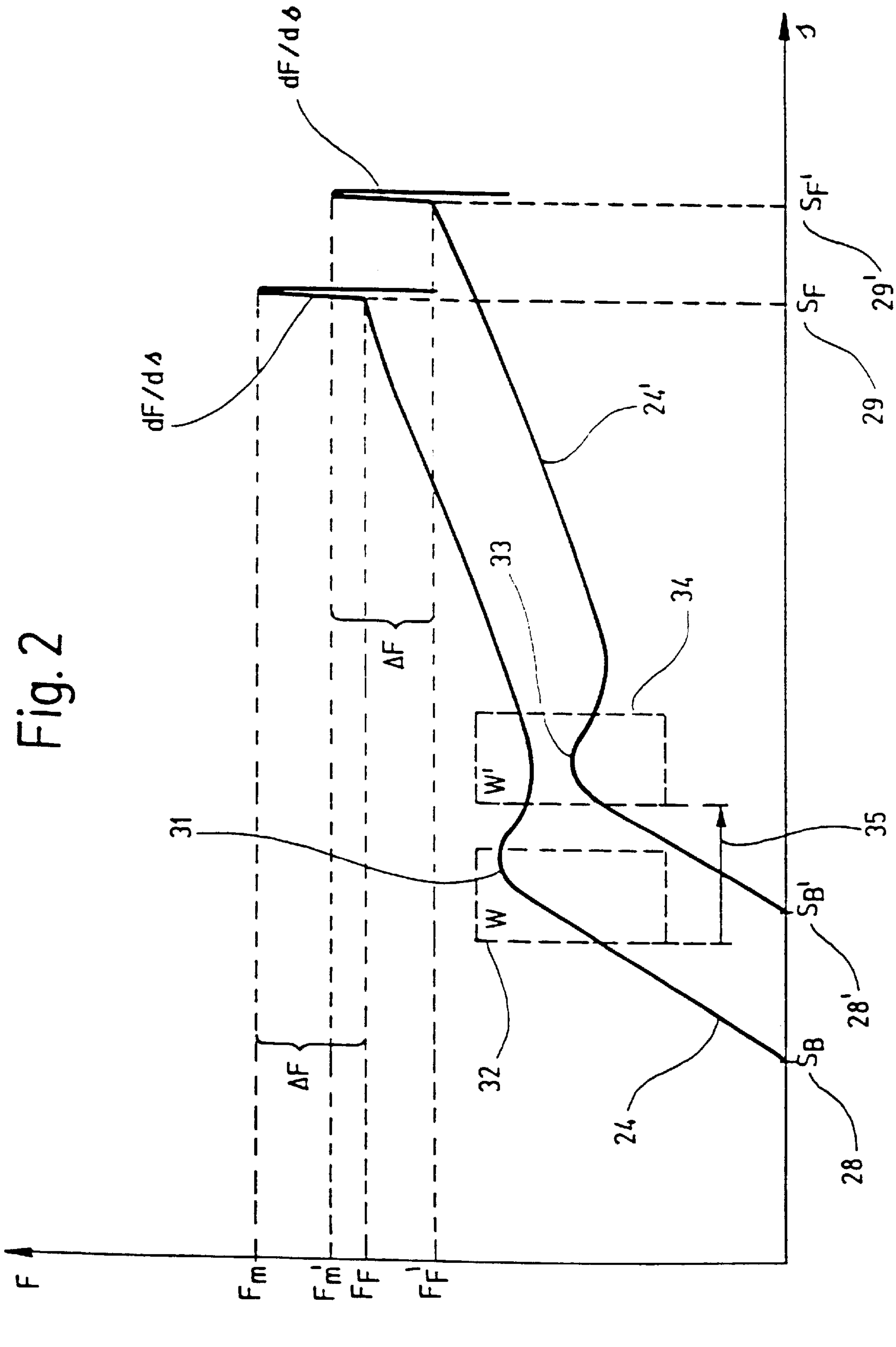
FIG. 2 shows an example of a curve for compressive force versus press ram displacement, as measured on the electric press shown in FIG. 1.

FIG. 2 depicts, by way of example, two curves 24, 24' representing the profile of compressive force versus displacement; curve 24 is intended to be a comparison curve ascertained on the basis of sample workpieces. In its position $S_B$, press ram 19 has reached the position in which the pressing operation begins, i.e. it must exert force in order to join workpieces 21, 22 to one another. What is first observed is a force increase, up to a superelevation 31 at which stiction transitions into sliding friction; as the working stroke continues further, the compressive force initially declines again, and then rises again until upon reaching joining position $S_F$ it has attained a force $F_F$. The compressive force F then rises steeply until the pressing operation is terminated and ram 19 is retracted.

Control system 11 continuously monitors the rise in the compressive force, and at point $F_F$ now detects a sudden change in the slope dF/ds or dF/dt, thus detecting that the joining point has been reached. Since the rise cannot be sensed in an arbitrarily short time, a certain force superelevation $\Delta F$ occurs (to $F_m$), but this does not cause any damage to the workpieces.

The profile of curve 24 is also critical to the result of the pressing operation, and control system 11 therefore monitors a whole series of parameters to ensure they are observed. These parameters include the joining position $S_F$ and compressive force F. If, for example, the joining position $S_F$ is not reached, the pressing operation was not successful. Since, however, a deviation of this kind does not necessarily indicate a failed pressing operation, but rather might be attributable to the fact that the parts being joined have different tolerances, the parameters being monitored are now dynamically adapted based on the profile of curve 24.

In a first step, the onset of the pressing operation, i.e. position 28, is monitored. With curve 24' the compressive force begins much later, only at position $S_{B'}$. Thus in the simplest case, the joining point $S_{F'}$ is also modified, by a value exactly equal to that offset, in the set of monitoring parameter, as indicated in FIG. 2.

It is also evident that when the joining point $S_{F'}$ is reached, curve 24' has a lower compressive force, namely a compressive force $F_{F'}$. If control system 11 now waited to terminate the pressing operation until force $F_m$ had been reached, an unnecessarily large force would be expended, which is undesirable for the reasons already mentioned. Control system 11 once again, however, detects the steep rise in the force and immediately terminates the pressing operation, so that the force can rise only to a value $F_{m'}$.

In other words, this means that curve 24' in FIG. 2 is merely shifted to the right and downward; this was detected, by way of points $S_{B'}$ and dF/ds, by the control system which thereupon dynamically adapts the parameter $S_{F'}$ and terminates the pressing operation.

It is not only the beginning and completion of the pressing operation which are responsible for a successful result, however; the profile of the compressive force during the working stroke also plays a major role. For example, the superelevation 31 is an indication that workpiece 21 has been completely pressed into workpiece 22, because continuation of the pressing operation initially requires a lesser force once this joining has occurred. This superelevation 31 is monitored using a further parameter set W which is indicated in FIG. 2 by a window 32. A further prerequisite for a successful pressing operation is thus the fact that curve 24 passes through window 32, and exhibits a superelevation 31. The curve can have any desired position in window 32.

It is evident, however, that curve 24' does not pass through window 32 at all, so that pressing operation 24' would not of itself be considered successful. The fact that curve 24' does not intersect window 32 is due, however, to the fact that because of the workpiece tolerances, the onset of pressing 28' and thus the entire curve 24' in FIG. 2 was shifted to the right. Since the control system detects this based on the shift of point $S_B$ to $S_{B'}$, a dynamically adapted parameter set W' is generated, indicated by a window 34 which has been shifted to the right by a magnitude 35 as compared to window 32. As long as curve 24' now passes through window 34, the pressing operation will be considered successful.

Of course various such windows 32, 34 can be laid over curve 24 in order to monitor different portions of the pressing operation. The number and location of the windows depend on the workpieces 21, 22 being joined.

This means, however, that a new sample curve 24, and new windows 32, 34, must be ascertained for different types of workpieces 21, 22.

This is done by joining sample workpieces, which involves using electronic handwheel 15 to adjust not only working stroke 28 of electric press 10 but also, in particular, the compressive force F of press ram 19. The instantaneous profile of the compressive force is displayed in real time on screen 12, so that the operator recording a new curve 24 can make fine adjustments to the compressive force using electronic handwheel 15, and can immediately check the result on screen 12. Windows 32, 34 can then also be adjusted on screen 12. New sample workpieces are then pressed; the instantaneous compressive force profile can once again be displayed on screen 12, and at the same time the position of windows 32, 34 can be checked. Once a large number of sample workpieces has been pressed in this fashion, appropriate parameters sets are available, comprising windows 32, 34 and the positions $S_B$ at onset of pressing 28 and $S_P$ at the end of the pressing operation.

Therefore, what I claim is:

1. A method of operating an electrically driven press for executing a pressing operation on a workpiece, said press having:

a ram, means for displacing said ram along predetermined positions (s) of a working stroke and for exerting a compression force (F) on said workpiece, a first sensor for generating a first signal corresponding to said positions (s), a second sensor for generating a second signal corresponding to said compression force (F), and means for controlling said displacing means as a function of said first and said second signals, the method comprising in a first sequence of steps:

a) generating a nominal function of said compression force (F) vs. said positions (s) for a pressing operation on a nominal workpiece, said compression force (F) being zero for an initial range of said positions (s) and then rising from a pressing onset position;

b) defining in said nominal function a nominal value indicative of a successful completion of said pressing operation;

the method, further, comprising in a second sequence of steps:

c) positioning a production workpiece in said press;

d) displacing said ram along said working stroke for pressing said production workpiece;

e) during step d) measuring said first and said second signals and generating a production function of said compression force (F) vs. said positions (s) for said pressing operation on said production workpiece;

f) during said step e) comparing said production function with said nominal function;

g) in case a difference is determined during step f) between a first pressing onset position for said nominal workpiece and a second pressing onset position for said production workpiece, shifting said nominal value by an amount related to said difference between said first and said second pressing onset positions;

h) after said shifting of said nominal value, controlling whether said first and said second signals reach said shifted nominal value; and i) evaluating said pressing of said production workpiece as unsuccessful if it is determined during step h) that said first and second signals have not reached said shifted nominal value.

2. The method of claim 1, wherein said nominal value comprises a window (W) therearound.

3. The method of claim 1, wherein said nominal value is a position of a first force superelevation in said nominal function occurring between said onset position and a joining position of said ram assumed upon completion of said pressing operation.

4. The method of claim 1, wherein said nominal value is a position of a second force superelevation (dF/ds) in said nominal function occurring upon completion of said pressing operation.

5. A method of operating an electrically driven press for executing a pressing operation on a workpiece, said press having:

a ram, means for displacing said ram along predetermined positions (s) of a working stroke and for exerting a compression force (F) on said workpiece, a first sensor for generating a first signal corresponding to said positions (s), a second sensor for generating a second signal corresponding to said compression force (F), and means for controlling said displacing means as a function of said first and said second signals, the method comprising in a first sequence of steps:

a) generating a nominal function of said compression force (F) vs. said positions (s) for a pressing operation on a nominal workpiece, said compression force (F) being zero for an initial range of said positions (s) and then rising from a pressing onset position;

b) determining in said nominal function, as a nominal value indicative of a successful completion of said pressing operation, a rapid increase in said compressive force vs. position function (dF/ds), occurring upon completion of said pressing operation;

the method, further, comprising in a second sequence of steps:

c) positioning a production workpiece in said press;

d) displacing said ram along said working stroke for pressing said production workpiece;

e) during step d) measuring said first and said second signals and generating a production function of said compression force (F) vs. said positions (s) for said pressing operation on said production workpiece;

f) during said step e) comparing said production function with said nominal function;

g) in case a difference is determined during step f) between a first pressing onset position for said nominal workpiece and a second pressing onset position for said production workpiece, shifting said nominal value by an amount related to said difference between said first and said second pressing onset positions;

h) after said shifting of said nominal value, controlling whether said first and said second signals reach said nominal value; and i) evaluating said pressing of said production workpiece as unsuccessful if it is determined during step h) that said first and second signals have not reached said nominal value.

6. A method of operating an electrically driven press for executing a pressing operation on a workpiece, said press having:

a ram, means for displacing said ram along predetermined positions (s) of a working stroke and for exerting a compression force (F) on said workpiece, a sensor for generating a signal corresponding to said compression force (F), and means for controlling said displacing means as a function of said signal, the method comprising:

a) positioning a production workpiece in said press;

b) displacing said ram along said working stroke for pressing said production workpiece;

c) during step b) measuring said signal:

d) in case a predetermined superelevation of said signal is determined during step c) indicative of a successful completion of said pressing operation, stopping said ram and removing said workpiece from said press.

7. A method of operating an electrically driven press for executing a pressing operation on a workpiece, said press having:

a ram, means for displacing said ram along predetermined positions (s) of a working stroke and for exerting a compression force (F) on said workpiece, a first sensor for generating a first signal corresponding to said positions (s), a second sensor for generating a second signal corresponding to said compression force (F), and means for controlling said displacing means as a function of said first and said second signals, the method comprising in a first sequence of steps:

a) generating a nominal function of said compression force (F) vs. said positions (s) for a pressing operation on a nominal workpiece, said compression force (F) being zero for an initial range of said positions (s) and then rising from a pressing onset position;

b) defining in said nominal function a nominal value indicative of a successful completion of said pressing operation;

the method, further, comprising in a second sequence of steps:

c) positioning a production workpiece in said press;

d) displacing said ram along said working stroke for pressing said production workpiece;

e) during step d) measuring said first and said second signals and generating a production function of said compression force (F) vs. said positions (s) for said pressing operation on said production workpiece;

f) during said step e) comparing said production function with said nominal function;

g) in case a difference is determined during step f) between said nominal function and said production function, shifting said nominal value by an amount related to said difference;

h) after said shifting of said nominal value, controlling whether said first and said second signals reach said shifted nominal value; and i) evaluating said pressing of said production workpiece as unsuccessful if it is determined during step h) that said first and second signals have not reached said shifted nominal value.

* * * * *